US011612458B1

(12) United States Patent
Tong et al.

(10) Patent No.: US 11,612,458 B1
(45) Date of Patent: Mar. 28, 2023

(54) METHOD OF TONGUE PRECONDITIONING IN PREPARATION FOR LINGUAL ORTHODONTIC TREATMENT

(71) Applicant: Swift Health Systems Inc., Irvine, CA (US)

(72) Inventors: Hongsheng Tong, Yorba Linda, CA (US); Philong John Pham, Huntington Beach, CA (US); Allen Huynh, Irvine, CA (US); Robert Lee, Torrance, CA (US); Vijay Dhaka, Irvine, CA (US)

(73) Assignee: Swift Health Systems Inc., Irvine, CA (US)

( * ) Notice: Subject to any disclaimer, the term of this patent is extended or adjusted under 35 U.S.C. 154(b) by 108 days.

(21) Appl. No.: 15/941,998

(22) Filed: Mar. 30, 2018

Related U.S. Application Data (60) Provisional application No. 62/480,168, filed on Mar. 31, 2017.

(51) Int. Cl.
*A61C 7/14* (2006.01)
*A61C 7/12* (2006.01)
*A61C 7/20* (2006.01)

(52) U.S. Cl.
CPC .............. *A61C 7/145* (2013.01); *A61C 7/125* (2013.01); *A61C 7/146* (2013.01); *A61C 7/20* (2013.01)

(58) Field of Classification Search
CPC ........... A61C 7/20; A61C 7/125; A61C 7/145; A61C 7/146
See application file for complete search history.

(56) References Cited

U.S. PATENT DOCUMENTS

| 1,005,131 A | 10/1911 | Angle et al. |
| 1,307,382 A | 6/1919 | Stanton |
| 1,429,749 A | 9/1922 | Maeulen et al. |
| 1,638,006 A | 2/1926 | Aderer |

(Continued)

FOREIGN PATENT DOCUMENTS

| CN | 1372872 | 10/2002 |
| CN | 201079455 | 7/2008 |

(Continued)

OTHER PUBLICATIONS

U.S. Appl. No. 15/249,262, filed Aug. 26, 2016, Tong et al.

(Continued)

*Primary Examiner* — Nicholas D Lucchesi
*Assistant Examiner* — Hao D Mai
(74) *Attorney, Agent, or Firm* — Knobbe Martens Olson & Bear, LLP (57) ABSTRACT

Disclosed herein are devices, systems, and method for preconditioning lingual tissue for lingual orthodontic treatment, including the application of lingual braces. Protuberances may be affixed to the lingual surfaces of one or more of a patient's teeth prior to the introduction of an orthodontic appliance to allow time for the tongue to adapt to the presence of foreign structures. The protuberances may promote keratinization of the lingual tissue. The protuberances may be removed prior to the application of the orthopedic appliance. The protuberances can be pre-fabricated or fabricated in situ on the surfaces of the teeth. The protuberances may be any suitable material, including metal, polymer, or ceramic.

18 Claims, 3 Drawing Sheets

(56) References Cited

U.S. PATENT DOCUMENTS

| | | | |
|---|---|---|---|
| 2,257,069 A * | 9/1941 | Peak | A61C 7/12 433/15 |
| 2,495,692 A | 1/1950 | Brusse | |
| 2,524,763 A | 10/1950 | Brusse | |
| 2,582,230 A | 1/1952 | Brusse | |
| 3,256,602 A | 6/1966 | Broussard | |
| 3,262,207 A | 7/1966 | Kesling | |
| 3,374,542 A | 3/1968 | Moylan, Jr. | |
| 3,593,421 A | 7/1971 | Brader | |
| 3,600,808 A | 8/1971 | Reeve | |
| 3,683,502 A | 8/1972 | Wallshein | |
| 3,691,635 A | 9/1972 | Wallshein | |
| 3,762,050 A | 10/1973 | Dal Pont | |
| 3,765,091 A | 10/1973 | Northcutt | |
| 3,878,610 A | 4/1975 | Coscina | |
| 3,936,938 A | 2/1976 | Northcutt | |
| 3,949,477 A | 4/1976 | Cohen et al. | |
| 3,975,823 A | 8/1976 | Sosnay | |
| 4,103,423 A | 8/1978 | Kessel | |
| 4,171,568 A | 10/1979 | Forster | |
| 4,192,070 A | 3/1980 | Lemchen et al. | |
| 4,193,195 A | 3/1980 | Merkel et al. | |
| 4,197,643 A | 4/1980 | Burstone et al. | |
| 4,268,250 A | 5/1981 | Reeve | |
| 4,330,273 A | 5/1982 | Kesling | |
| 4,354,833 A | 10/1982 | Fujita | |
| 4,354,834 A | 10/1982 | Wilson | |
| 4,382,781 A | 5/1983 | Grossman | |
| 4,385,890 A | 5/1983 | Klein | |
| 4,412,819 A | 11/1983 | Cannon | |
| 4,424,033 A | 1/1984 | Wool | |
| 4,436,510 A | 3/1984 | Klein | |
| 4,479,779 A | 10/1984 | Wool | |
| 4,483,674 A | 11/1984 | Schütz | |
| 4,490,112 A | 12/1984 | Tanaka et al. | |
| 4,501,554 A | 2/1985 | Hickham | |
| 4,516,938 A | 5/1985 | Hall | |
| 4,533,320 A | 8/1985 | Piekarsky | |
| 4,561,844 A | 12/1985 | Bates | |
| 4,582,487 A | 4/1986 | Creekmore | |
| 4,585,414 A | 4/1986 | Kottermann | |
| 4,592,725 A | 6/1986 | Goshgarian | |
| 4,634,662 A | 1/1987 | Rosenberg | |
| 4,656,860 A | 4/1987 | Orthuber et al. | |
| 4,659,310 A | 4/1987 | Kottermann | |
| 4,664,626 A | 5/1987 | Kesling | |
| 4,674,978 A | 6/1987 | Acevedo | |
| 4,676,747 A | 6/1987 | Kesling | |
| 4,725,229 A | 2/1988 | Miller | |
| 4,797,093 A | 1/1989 | Bergersen | |
| 4,797,095 A | 1/1989 | Armstrong et al. | |
| 4,838,787 A | 6/1989 | Lerner | |
| 4,842,514 A | 6/1989 | Kesling | |
| 4,872,449 A | 10/1989 | Beeuwkes | |
| 4,881,896 A | 11/1989 | Bergersen | |
| 4,892,479 A | 1/1990 | McKenna | |
| 4,897,035 A | 1/1990 | Green | |
| 4,900,251 A | 2/1990 | Andreasen | |
| 4,978,323 A | 12/1990 | Freedman | |
| 5,011,405 A | 4/1991 | Lemchen | |
| 5,044,947 A | 9/1991 | Sachdeva et al. | |
| 5,055,039 A | 10/1991 | Abbatte et al. | |
| 5,092,768 A | 3/1992 | Korn | |
| 5,114,339 A * | 5/1992 | Guis | A61C 7/146 433/24 |
| 5,123,838 A * | 6/1992 | Cannon | A61C 7/287 433/14 |
| 5,127,828 A | 7/1992 | Suyama | |
| 5,131,843 A | 7/1992 | Hilgers et al. | |
| 5,154,606 A | 10/1992 | Wildman | |
| 5,174,754 A | 12/1992 | Meritt | |
| 5,176,514 A | 1/1993 | Viazis | |
| 5,176,618 A | 1/1993 | Freedman | |
| 5,238,404 A | 8/1993 | Andreiko | |
| 5,242,304 A | 9/1993 | Truax et al. | |
| 5,248,257 A * | 9/1993 | Cannon | A61C 7/287 433/14 |
| 5,259,760 A | 11/1993 | Orikasa | |
| 5,312,247 A | 5/1994 | Sachdeva et al. | |
| 5,344,315 A | 9/1994 | Hanson | |
| 5,368,478 A | 11/1994 | Andreiko | |
| 5,380,197 A | 1/1995 | Hanson | |
| 5,399,087 A | 3/1995 | Arndt | |
| 5,431,562 A | 7/1995 | Andreiko | |
| 5,447,432 A | 9/1995 | Andreiko | |
| 5,454,717 A | 10/1995 | Andreiko | |
| RE35,169 E | 3/1996 | Lemchen et al. | |
| 5,516,284 A | 5/1996 | Wildman | |
| 5,624,258 A | 4/1997 | Wool | |
| 5,630,715 A | 5/1997 | Voudouris | |
| 5,683,243 A | 11/1997 | Andreiko | |
| 5,683,245 A | 11/1997 | Sachdeva et al. | |
| 5,722,827 A | 3/1998 | Allesee | |
| 5,816,800 A | 10/1998 | Brehm | |
| 5,820,370 A | 10/1998 | Brosius | |
| 5,863,198 A | 1/1999 | Doyle | |
| 5,890,893 A | 4/1999 | Heiser | |
| 5,975,893 A | 11/1999 | Chishti et al. | |
| 5,993,208 A * | 11/1999 | Jonjic | A61C 13/04 433/34 |
| 6,015,289 A | 1/2000 | Andreiko | |
| 6,036,489 A | 3/2000 | Brosius | |
| 6,042,374 A | 3/2000 | Farzin-Nia et al. | |
| 6,086,364 A | 7/2000 | Brunson | |
| 6,089,861 A | 7/2000 | Kelly | |
| 6,095,809 A | 8/2000 | Kelly et al. | |
| 6,099,304 A * | 8/2000 | Carter | A61C 7/36 433/19 |
| 6,123,544 A | 9/2000 | Cleary | |
| 6,183,250 B1 | 2/2001 | Kanno et al. | |
| 6,190,166 B1 | 2/2001 | Sasakura | |
| 6,196,839 B1 | 3/2001 | Ross | |
| 6,217,325 B1 | 4/2001 | Chishti et al. | |
| 6,227,850 B1 | 5/2001 | Chishti et al. | |
| 6,244,861 B1 | 6/2001 | Andreiko | |
| 6,250,918 B1 | 6/2001 | Sachdeva et al. | |
| 6,315,553 B1 | 11/2001 | Sachdeva et al. | |
| 6,318,994 B1 | 11/2001 | Chishti et al. | |
| 6,318,995 B1 | 11/2001 | Sachdeva et al. | |
| 6,334,853 B1 | 1/2002 | Kopelman et al. | |
| 6,350,120 B1 | 2/2002 | Sachdeva et al. | |
| 6,358,045 B1 | 3/2002 | Farzin-Nia et al. | |
| 6,371,761 B1 | 4/2002 | Cheang et al. | |
| 6,394,801 B2 | 5/2002 | Chishti et al. | |
| 6,398,548 B1 | 6/2002 | Muhammad et al. | |
| 6,413,084 B1 | 6/2002 | Rubbert et al. | |
| 6,431,870 B1 | 8/2002 | Sachdeva | |
| 6,450,807 B1 | 9/2002 | Chishti et al. | |
| 6,464,496 B1 | 10/2002 | Sachdeva et al. | |
| 6,471,511 B1 | 10/2002 | Chishti et al. | |
| 6,471,512 B1 | 10/2002 | Sachdeva et al. | |
| 6,512,994 B1 | 1/2003 | Sachdeva | |
| 6,514,074 B1 | 2/2003 | Chishti et al. | |
| 6,532,299 B1 | 3/2003 | Sachdeva et al. | |
| 6,540,512 B1 | 4/2003 | Sachdeva et al. | |
| 6,554,613 B1 | 4/2003 | Sachdeva et al. | |
| 6,572,693 B1 | 6/2003 | Wu et al. | |
| 6,582,226 B2 | 6/2003 | Jordan et al. | |
| 6,587,828 B1 | 7/2003 | Sachdeva | |
| 6,595,774 B1 | 7/2003 | Risse | |
| 6,554,611 B2 | 8/2003 | Chishti et al. | |
| 6,602,070 B2 | 8/2003 | Miller et al. | |
| 6,612,143 B2 | 9/2003 | Butscher et al. | |
| 6,616,444 B2 | 9/2003 | Andreiko | |
| 6,626,666 B2 | 9/2003 | Chishti et al. | |
| 6,629,840 B2 | 10/2003 | Chishti et al. | |
| 6,632,089 B2 | 10/2003 | Rubbert | |
| 6,648,640 B2 | 11/2003 | Rubbert | |
| 6,663,385 B2 | 12/2003 | Tepper | |
| 6,679,700 B2 | 1/2004 | McGann | |
| 6,682,344 B1 | 1/2004 | Stockstill | |
| 6,685,469 B2 | 2/2004 | Chishti et al. | |
| 6,685,470 B2 | 2/2004 | Chishti et al. | |
| 6,688,885 B1 | 2/2004 | Sachdeva et al. | |

(56) References Cited

U.S. PATENT DOCUMENTS

| | | |
|---|---|---|
| 6,699,037 B2 | 3/2004 | Chishti et al. |
| 6,702,575 B2 | 3/2004 | Hilliard |
| 6,705,863 B2 | 3/2004 | Phan et al. |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,830,450 B2 | 12/2004 | Knopp et al. |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,928,733 B2 | 8/2005 | Rubbert et al. |
| 6,948,931 B2 | 9/2005 | Chishti et al. |
| 6,971,873 B2 | 12/2005 | Sachdeva |
| 6,988,889 B2 | 1/2006 | Abels |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,094,053 B2 | 8/2006 | Andreiko |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,156,661 B2 | 1/2007 | Choi et al. |
| 7,160,110 B2 | 1/2007 | Imgrund et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 | 3/2007 | Cleary et al. |
| 7,214,056 B2 | 5/2007 | Stockstill |
| 7,229,282 B2 | 6/2007 | Andreiko |
| 7,234,934 B2 | 6/2007 | Rosenberg |
| 7,234,936 B2 | 6/2007 | Lai |
| 7,234,937 B2 | 6/2007 | Sachdeva et al. |
| 7,240,528 B2 | 7/2007 | Weise et al. |
| 7,244,121 B2 | 7/2007 | Brosius |
| 7,245,977 B1 | 7/2007 | Simkins |
| 7,252,506 B2 | 8/2007 | Lai |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,404,714 B2 | 7/2008 | Cleary et al. |
| 7,416,408 B2 | 8/2008 | Farzin-Nia et al. |
| 7,442,041 B2 | 10/2008 | Imgrund et al. |
| 7,458,812 B2 | 12/2008 | Sporbert et al. |
| 7,471,821 B2 | 12/2008 | Rubbert et al. |
| 7,578,673 B2 | 8/2009 | Wen et al. |
| 7,578,674 B2 | 8/2009 | Chishti et al. |
| 7,585,172 B2 | 9/2009 | Rubbert |
| 7,590,462 B2 | 9/2009 | Rubbert |
| 7,621,743 B2 | 11/2009 | Bathen |
| 7,641,473 B2 | 1/2010 | Sporbert |
| 7,674,110 B2 | 3/2010 | Oda |
| 7,677,887 B2 | 3/2010 | Nicholson |
| 7,699,606 B2 | 4/2010 | Sachdeva et al. |
| 7,704,072 B2 | 4/2010 | Damon |
| 7,717,708 B2 | 5/2010 | Sachdeva |
| 7,722,354 B1 | 5/2010 | Dumas |
| 7,726,470 B2 | 6/2010 | Cinader, Jr. et al. |
| 7,726,968 B2 | 6/2010 | Raby et al. |
| 7,751,925 B2 | 7/2010 | Rubbert |
| 7,811,087 B2 | 10/2010 | Wiechmann |
| 7,837,464 B2 | 11/2010 | Marshall |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |
| 7,878,806 B2 | 2/2011 | Lemchen |
| 7,909,603 B2 | 3/2011 | Oda |
| 7,950,131 B2 | 5/2011 | Hilliard |
| 7,993,133 B2 | 8/2011 | Cinader, Jr. et al. |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher |
| 8,092,215 B2 | 1/2012 | Stone-Collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,121,718 B2 | 2/2012 | Rubbert |
| 8,142,187 B2 | 3/2012 | Sporbert |
| 8,152,519 B1 | 4/2012 | Dumas et al. |
| 8,192,196 B2 | 6/2012 | Singh |
| 8,192,197 B2 | 6/2012 | Sporbert |
| 8,194,067 B2 | 6/2012 | Raby |
| 8,220,195 B2 | 7/2012 | Maijer et al. |
| 8,251,699 B2 | 8/2012 | Reising et al. |
| 8,266,940 B2 | 9/2012 | Riemeir et al. |
| 8,297,970 B2 | 10/2012 | Kanomi |
| 8,308,478 B2 | 11/2012 | Primus et al. |
| 8,313,327 B1 | 11/2012 | Won |
| 8,359,115 B2 | 1/2013 | Kopelman et al. |
| 8,363,228 B2 | 1/2013 | Babayoff |
| 8,366,440 B2 | 2/2013 | Bathen |
| 8,376,739 B2 | 2/2013 | Dupray |
| 8,382,917 B2 | 2/2013 | Johnson |
| 8,393,896 B2 | 3/2013 | Oda |
| 8,417,366 B2 | 4/2013 | Getto |
| 8,439,671 B2 | 5/2013 | Cinader, Jr. |
| 8,451,456 B2 | 5/2013 | Babayoff |
| 8,454,364 B2 | 6/2013 | Taub et al. |
| 8,459,988 B2 | 6/2013 | Dumas |
| 8,465,279 B2 | 6/2013 | Bathen |
| 8,469,704 B2 | 6/2013 | Oda et al. |
| 8,479,393 B2 | 7/2013 | Abels et al. |
| 8,485,816 B2 | 7/2013 | Macchi |
| D688,803 S | 8/2013 | Gilbert |
| 8,500,445 B2 | 8/2013 | Borri |
| 8,517,727 B2 | 8/2013 | Raby et al. |
| 8,545,221 B2 | 10/2013 | Sonte-collenge et al. |
| 8,562,337 B2 | 10/2013 | Kuo et al. |
| 8,573,972 B2 | 11/2013 | Matov et al. |
| 8,591,225 B2 | 11/2013 | Wu et al. |
| 8,591,226 B2 | 11/2013 | Griffith et al. |
| 8,636,505 B2 | 1/2014 | Fornoff |
| 8,638,447 B2 | 1/2014 | Babayoff et al. |
| 8,638,448 B2 | 1/2014 | Babayoff et al. |
| 8,675,207 B2 | 3/2014 | Babayoff |
| 8,678,818 B2 | 3/2014 | Dupray |
| 8,690,568 B2 | 4/2014 | Chapouland |
| 8,708,697 B2 | 4/2014 | Li et al. |

(56) References Cited

U.S. PATENT DOCUMENTS

| | | |
|---|---|---|
| 8,714,972 B2 | 5/2014 | Eichenberg |
| 8,734,149 B2 | 5/2014 | Phan et al. |
| 8,780,106 B2 | 7/2014 | Chishti et al. |
| 8,805,048 B2 | 8/2014 | Batesole |
| 8,805,563 B2 | 8/2014 | Kopelman et al. |
| 8,807,995 B2 | 8/2014 | Kabbani et al. |
| 8,827,697 B2 | 9/2014 | Cinader, Jr. et al. |
| 8,845,330 B2 | 9/2014 | Taub et al. |
| 8,871,132 B2 | 10/2014 | Abels et al. |
| 8,931,171 B2 | 1/2015 | Abels et al. |
| 8,932,054 B1 | 1/2015 | Rosenberg |
| 8,936,464 B2 | 1/2015 | Kopelman |
| 8,961,172 B2 | 2/2015 | Dupray |
| 8,968,365 B2 | 3/2015 | Aschmann et al. |
| 8,979,528 B2 | 3/2015 | Macchi |
| 8,986,004 B2 | 3/2015 | Dumas |
| 8,992,215 B2 | 3/2015 | Chapouland |
| 8,998,608 B2 | 4/2015 | Imgrund et al. |
| 9,022,781 B2 | 5/2015 | Kuo et al. |
| 9,066,775 B2 | 6/2015 | Bukhary |
| 9,089,386 B2 | 7/2015 | Hagelganz |
| 9,101,433 B2 | 8/2015 | Babayoff |
| 9,119,689 B2 | 9/2015 | Kabbani |
| 9,127,338 B2 | 9/2015 | Johnson |
| 9,144,473 B2 | 9/2015 | Aldo |
| 9,204,942 B2 | 12/2015 | Phan et al. |
| 9,299,192 B2 | 3/2016 | Kopelman |
| 9,301,815 B2 | 4/2016 | Dumas |
| 9,329,675 B2 | 5/2016 | Ojelund et al. |
| 9,339,352 B2 | 5/2016 | Cinader et al. |
| 9,402,695 B2 | 8/2016 | Curiel et al. |
| 9,427,291 B2 | 8/2016 | Khoshnevis et al. |
| 9,427,916 B2 | 8/2016 | Taub et al. |
| 9,439,737 B2 | 9/2016 | Gonzales et al. |
| 9,451,873 B1 | 9/2016 | Kopelman et al. |
| 9,492,246 B2 | 11/2016 | Lin |
| 9,498,302 B1 | 11/2016 | Patel |
| D774,193 S | 12/2016 | Makmel et al. |
| 9,510,757 B2 | 12/2016 | Kopelman |
| 9,517,112 B2 | 12/2016 | Hagelganz et al. |
| 9,529,970 B2 | 12/2016 | Andreiko |
| 9,539,064 B2 | 1/2017 | Abels et al. |
| 9,554,875 B2 | 1/2017 | Gualano |
| 9,566,132 B2 | 2/2017 | Stone-collonge et al. |
| 9,566,134 B2 | 2/2017 | Hagelganz et al. |
| 9,585,733 B2 | 3/2017 | Voudouris |
| 9,585,734 B2 | 3/2017 | Lai et al. |
| 9,610,628 B2 | 4/2017 | Riemeier |
| 9,615,901 B2 | 4/2017 | Babayoff et al. |
| 9,622,834 B2 | 4/2017 | Chapouland |
| 9,629,551 B2 | 4/2017 | Fisker et al. |
| 9,629,694 B2 | 4/2017 | Chun et al. |
| 9,707,056 B2 | 7/2017 | Machata et al. |
| 9,788,917 B2 | 10/2017 | Mah |
| 9,814,543 B2 | 11/2017 | Huang et al. |
| 9,844,420 B2 | 12/2017 | Cheang |
| 9,848,958 B2 | 12/2017 | Matov et al. |
| 9,867,678 B2 | 1/2018 | Macchi |
| 9,867,680 B2 | 1/2018 | Damon |
| 9,872,741 B2 | 1/2018 | Gualano |
| 9,877,804 B2 | 1/2018 | Chester |
| 9,877,805 B2 | 1/2018 | Abels et al. |
| 9,925,020 B2 | 3/2018 | Jo |
| 9,937,018 B2 | 4/2018 | Martz et al. |
| 9,937,020 B2 | 4/2018 | Choi |
| 9,962,244 B2 | 5/2018 | Esbech et al. |
| 9,975,294 B2 | 5/2018 | Taub et al. |
| 9,987,105 B2 | 6/2018 | Dupray |
| 10,028,804 B2 | 7/2018 | Schulhof et al. |
| 10,045,834 B2 | 8/2018 | Gualano |
| 10,052,177 B2 | 8/2018 | Andreiko |
| 10,058,400 B2 | 8/2018 | Abels et al. |
| 10,058,401 B2 | 8/2018 | Tan |
| 10,064,706 B2 | 9/2018 | Dickerson |
| 10,070,943 B2 | 9/2018 | Fornoff |
| 10,076,780 B2 | 9/2018 | Riemeier et al. |
| 10,098,709 B1 | 10/2018 | Kitching et al. |
| 10,130,987 B2 | 11/2018 | Riemeier et al. |
| 10,136,966 B2 | 11/2018 | Reybrouck et al. |
| 10,149,738 B2 | 12/2018 | Lee |
| 10,179,036 B2 | 1/2019 | Lee |
| 10,219,877 B2 | 3/2019 | Khoshnevis et al. |
| 10,226,312 B2 | 3/2019 | Khoshnevis et al. |
| 10,278,791 B2 | 5/2019 | Schumacher |
| 10,278,792 B2 | 5/2019 | Wool |
| 10,292,789 B2 | 5/2019 | Martz et al. |
| 10,314,673 B2 | 6/2019 | Schulhof et al. |
| 10,327,867 B2 | 6/2019 | Nikolskiy et al. |
| 10,342,640 B2 | 7/2019 | Cassalia |
| 10,368,961 B2 | 8/2019 | Paehl et al. |
| 10,383,707 B2 | 8/2019 | Roein Peikar et al. |
| D859,663 S | 9/2019 | Cetta et al. |
| 10,413,386 B2 | 9/2019 | Moon et al. |
| 10,426,575 B1 | 10/2019 | Raslambekov |
| 10,478,271 B2 | 11/2019 | Patel |
| 10,485,638 B2 | 11/2019 | Salah |
| 10,588,717 B2 | 3/2020 | Chun et al. |
| 10,595,966 B2 | 3/2020 | Carrier, Jr. et al. |
| 10,603,137 B2 | 3/2020 | Alauddin et al. |
| 10,636,522 B2 | 4/2020 | Katzman et al. |
| 10,639,130 B2 | 5/2020 | Blees et al. |
| 10,639,134 B2 | 5/2020 | Shangjani et al. |
| 10,717,208 B1 | 7/2020 | Raslambekov et al. |
| 10,772,706 B2 | 9/2020 | Schumacher |
| 10,806,376 B2 | 10/2020 | Lotan et al. |
| 10,809,697 B2 | 10/2020 | Grapsas |
| 10,828,133 B2 | 11/2020 | Tong et al. |
| 10,849,723 B1 | 12/2020 | Yancey et al. |
| 10,869,738 B2 | 12/2020 | Witte et al. |
| 10,881,489 B2 | 1/2021 | Tong et al. |
| 10,905,527 B2 | 2/2021 | Roein Peikar et al. |
| 10,932,887 B2 | 3/2021 | Hung |
| 10,952,820 B2 | 3/2021 | Song et al. |
| 10,980,614 B2 | 4/2021 | Roein Peikar et al. |
| 10,984,549 B2 | 4/2021 | Goncharov et al. |
| 10,993,782 B1 | 5/2021 | Raslambekov |
| 10,993,785 B2 | 5/2021 | Roein Peikar et al. |
| 11,045,281 B2 | 6/2021 | Tsai et al. |
| 11,058,517 B2 | 7/2021 | Tong et al. |
| 11,058,518 B2 | 7/2021 | Roein Peikar et al. |
| 11,058,520 B2 | 7/2021 | Khoshnevis et al. |
| 11,072,021 B2 | 7/2021 | Riemeier et al. |
| 11,083,411 B2 | 8/2021 | Yancey et al. |
| 11,083,546 B2 | 8/2021 | Cassalia |
| 11,103,330 B2 | 8/2021 | Webber et al. |
| 11,129,696 B2 | 9/2021 | Khoshnevis et al. |
| 11,147,652 B2 | 10/2021 | Mason et al. |
| 11,229,505 B2 | 1/2022 | Schumacher et al. |
| 11,304,781 B2 | 4/2022 | Chun et al. |
| 11,317,994 B2 | 5/2022 | Peikar et al. |
| 11,317,995 B2 | 5/2022 | Peikar et al. |
| 11,324,572 B2 | 5/2022 | Peikar et al. |
| 11,331,165 B2 | 5/2022 | Owen |
| 11,337,486 B2 | 5/2022 | Oda et al. |
| 2001/0055741 A1 | 12/2001 | Dixon et al. |
| 2002/0006597 A1 | 1/2002 | Andreiko et al. |
| 2002/0010568 A1 | 1/2002 | Rubbert et al. |
| 2002/0081546 A1 | 6/2002 | Tricca et al. |
| 2002/0098460 A1 | 7/2002 | Farzin-Nia |
| 2002/0192617 A1* | 12/2002 | Phan ............... A61C 7/00 433/6 |
| 2003/0049582 A1 | 3/2003 | Abels et al. |
| 2003/0180689 A1 | 9/2003 | Arx et al. |
| 2003/0194677 A1 | 10/2003 | Sachdeva et al. |
| 2004/0048222 A1 | 3/2004 | Forster et al. |
| 2004/0072120 A1 | 4/2004 | Lauren |
| 2004/0083611 A1 | 5/2004 | Rubbert et al. |
| 2004/0166459 A1 | 8/2004 | Voudouris |
| 2004/0219471 A1 | 11/2004 | Cleary et al. |
| 2005/0043837 A1* | 2/2005 | Rubbert ............ A61C 7/146 700/98 |
| 2005/0074716 A1 | 4/2005 | Cleary et al. |
| 2005/0106529 A1 | 5/2005 | Abolfathi et al. |
| 2005/0181332 A1 | 8/2005 | Sernetz |

(56) References Cited

U.S. PATENT DOCUMENTS

| | | |
|---|---|---|
| 2005/0191592 A1 | 9/2005 | Farzin-Nia et al. |
| 2005/0233276 A1* | 10/2005 | Kopelman ............. A61C 7/146 433/3 |
| 2005/0244780 A1 | 11/2005 | Abels et al. |
| 2005/0244781 A1 | 11/2005 | Abels et al. |
| 2005/0244790 A1 | 11/2005 | Kuperman |
| 2006/0068354 A1 | 3/2006 | Jeckel |
| 2006/0223021 A1 | 10/2006 | Cinader et al. |
| 2006/0223031 A1 | 10/2006 | Cinader, Jr. et al. |
| 2006/0257813 A1 | 11/2006 | Highland |
| 2006/0257821 A1 | 11/2006 | Cinader, Jr. et al. |
| 2007/0015103 A1* | 1/2007 | Sorel ................. A61C 7/14 433/8 |
| 2007/0031773 A1 | 2/2007 | Scuzzo |
| 2007/0031775 A1 | 2/2007 | Andreiko |
| 2007/0087302 A1* | 4/2007 | Reising ............. A61C 7/145 433/24 |
| 2007/0111154 A1 | 5/2007 | Sampermans |
| 2007/0134611 A1 | 6/2007 | Nicholson |
| 2007/0141525 A1 | 6/2007 | Cinader, Jr. |
| 2007/0154859 A1 | 7/2007 | Hilliard |
| 2007/0172788 A1 | 7/2007 | Hill, II et al. |
| 2007/0190478 A1 | 8/2007 | Goldberg et al. |
| 2007/0231768 A1 | 10/2007 | Hutchinson |
| 2007/0287121 A1 | 12/2007 | Cinader et al. |
| 2008/0032250 A1 | 2/2008 | Kopelman et al. |
| 2008/0057460 A1 | 3/2008 | Hicks |
| 2008/0063995 A1 | 3/2008 | Farzin-Nia et al. |
| 2008/0160475 A1* | 7/2008 | Rojas-Pardini ......... A61C 7/00 433/24 |
| 2008/0199825 A1 | 8/2008 | Jahn |
| 2008/0227049 A1 | 9/2008 | Sevinc |
| 2008/0233530 A1 | 9/2008 | Cinader |
| 2008/0248439 A1 | 10/2008 | Griffith et al. |
| 2008/0254403 A1 | 10/2008 | Hilliard |
| 2008/0286711 A1 | 11/2008 | Corcoran et al. |
| 2008/0305450 A1 | 12/2008 | Steen |
| 2009/0004619 A1 | 1/2009 | Oda et al. |
| 2009/0042160 A1 | 2/2009 | Ofir |
| 2009/0191502 A1* | 7/2009 | Cao ................. A61C 7/002 433/24 |
| 2009/0197217 A1 | 8/2009 | Butscher et al. |
| 2009/0220907 A1 | 9/2009 | Suyama |
| 2009/0220920 A1 | 9/2009 | Primus et al. |
| 2010/0092903 A1 | 4/2010 | Sabilla |
| 2010/0092905 A1 | 4/2010 | Martin |
| 2010/0105000 A1 | 4/2010 | Scommegna |
| 2010/0129765 A1 | 5/2010 | Mohr et al. |
| 2010/0129766 A1 | 5/2010 | Hilgers |
| 2010/0178628 A1 | 7/2010 | Kim |
| 2010/0179789 A1 | 7/2010 | Sachdeva et al. |
| 2010/0193979 A1 | 8/2010 | Goldberg et al. |
| 2010/0279243 A1 | 11/2010 | Cinader, Jr. et al. |
| 2010/0304321 A1 | 12/2010 | Patel |
| 2011/0008745 A1* | 1/2011 | McQuillan ........... A61C 8/0031 433/18 |
| 2011/0027743 A1 | 2/2011 | Cinader, Jr. et al. |
| 2011/0059414 A1 | 3/2011 | Hirsch |
| 2011/0091832 A1 | 4/2011 | Kim et al. |
| 2011/0220612 A1 | 9/2011 | Kim |
| 2011/0250556 A1* | 10/2011 | Heiser .................. A61C 7/146 433/3 |
| 2011/0270583 A1 | 11/2011 | Getto et al. |
| 2011/0287376 A1 | 11/2011 | Walther |
| 2011/0314891 A1 | 12/2011 | Gilbert |
| 2012/0148972 A1 | 6/2012 | Lewis |
| 2012/0208144 A1 | 8/2012 | Chiaramonte |
| 2012/0315595 A1 | 12/2012 | Beaudoin |
| 2012/0322019 A1 | 12/2012 | Lewis |
| 2013/0065193 A1 | 3/2013 | Curiel et al. |
| 2013/0122443 A1 | 5/2013 | Huang et al. |
| 2013/0196281 A1 | 8/2013 | Thornton |
| 2013/0196282 A1 | 8/2013 | Eichelberger et al. |
| 2013/0315595 A1 | 11/2013 | Barr |
| 2014/0120491 A1 | 5/2014 | Khoshnevis et al. |
| 2014/0154637 A1 | 6/2014 | Hansen et al. |
| 2014/0170586 A1 | 6/2014 | Cantarella |
| 2014/0255864 A1 | 9/2014 | Machata et al. |
| 2014/0287376 A1 | 9/2014 | Hultgren et al. |
| 2015/0010879 A1* | 1/2015 | Kurthy ................ A61C 9/0006 433/37 |
| 2015/0064641 A1 | 3/2015 | Gardner |
| 2015/0072299 A1 | 3/2015 | Alauddin et al. |
| 2015/0140501 A1 | 5/2015 | Kim |
| 2015/0313687 A1 | 11/2015 | Blees et al. |
| 2015/0351872 A1 | 12/2015 | Jo |
| 2015/0359610 A1 | 12/2015 | Gonzalez et al. |
| 2016/0074139 A1 | 3/2016 | Machata et al. |
| 2016/0095670 A1 | 4/2016 | Witte et al. |
| 2016/0106522 A1 | 4/2016 | Kim |
| 2016/0166357 A1 | 6/2016 | Portalupi |
| 2016/0175073 A1 | 6/2016 | Huang |
| 2016/0206403 A1* | 7/2016 | Ouellette ............. A61C 7/146 |
| 2016/0228214 A1 | 8/2016 | Sachdeva et al. |
| 2016/0242871 A1* | 8/2016 | Morton .................. A61C 7/08 |
| 2016/0270885 A1 | 9/2016 | Kwon et al. |
| 2016/0278883 A1 | 9/2016 | Fasci et al. |
| 2016/0287354 A1 | 10/2016 | Viecilli et al. |
| 2016/0310239 A1 | 10/2016 | Paehl et al. |
| 2016/0361141 A1 | 12/2016 | Tong et al. |
| 2016/0361142 A1 | 12/2016 | Tong et al. |
| 2016/0374780 A1 | 12/2016 | Carrillo Gonzalez et al. |
| 2017/0086948 A1 | 3/2017 | Von Mandach |
| 2017/0105817 A1 | 4/2017 | Chun et al. |
| 2017/0128169 A1 | 5/2017 | Lai et al. |
| 2017/0135793 A1 | 5/2017 | Webber et al. |
| 2017/0151037 A1 | 6/2017 | Lee |
| 2017/0156823 A1 | 6/2017 | Roein et al. |
| 2017/0165532 A1 | 6/2017 | Khan et al. |
| 2017/0196660 A1 | 7/2017 | Lee |
| 2017/0224444 A1 | 8/2017 | Viecilli et al. |
| 2017/0231721 A1 | 8/2017 | Akeel et al. |
| 2017/0252140 A1* | 9/2017 | Murphy ................ A61C 19/04 |
| 2017/0281313 A1 | 10/2017 | Kim |
| 2017/0281314 A1 | 10/2017 | Freimuller |
| 2017/0296304 A1 | 10/2017 | Tong et al. |
| 2017/0312052 A1 | 11/2017 | Moss et al. |
| 2018/0014916 A1 | 1/2018 | Cinader, Jr. et al. |
| 2018/0021108 A1 | 1/2018 | Cinader, Jr. et al. |
| 2018/0049847 A1 | 2/2018 | Oda et al. |
| 2018/0071057 A1 | 3/2018 | Rudman |
| 2018/0110589 A1 | 4/2018 | Gao |
| 2018/0132974 A1 | 5/2018 | Rudman |
| 2018/0153651 A1 | 6/2018 | Tong et al. |
| 2018/0185120 A1 | 7/2018 | Wool |
| 2018/0185121 A1 | 7/2018 | Pitts et al. |
| 2018/0214250 A1 | 8/2018 | Martz |
| 2018/0221113 A1 | 8/2018 | Tong et al. |
| 2018/0235437 A1 | 8/2018 | Ozerov et al. |
| 2018/0303583 A1 | 10/2018 | Tong et al. |
| 2018/0338564 A1 | 11/2018 | Oda et al. |
| 2019/0001396 A1 | 1/2019 | Riemeier et al. |
| 2019/0019187 A1 | 1/2019 | Miller et al. |
| 2019/0090988 A1 | 3/2019 | Schumacher et al. |
| 2019/0090989 A1* | 3/2019 | Jo ........................ A61C 7/28 |
| 2019/0125494 A1 | 5/2019 | Li et al. |
| 2019/0142551 A1 | 5/2019 | Dickenson et al. |
| 2019/0159871 A1* | 5/2019 | Chan ..................... A61C 7/00 |
| 2019/0163060 A1 | 5/2019 | Skamser et al. |
| 2019/0175304 A1* | 6/2019 | Morton ................ A61C 7/36 |
| 2019/0231488 A1 | 8/2019 | Dickerson |
| 2019/0247147 A1 | 8/2019 | Grande et al. |
| 2019/0252065 A1 | 8/2019 | Katzman et al. |
| 2019/0321136 A1 | 10/2019 | Martz et al. |
| 2019/0321138 A1 | 10/2019 | Peikar et al. |
| 2019/0328491 A1 | 10/2019 | Hostettler et al. |
| 2019/0343606 A1 | 11/2019 | Wu et al. |
| 2019/0350682 A1 | 11/2019 | Cinader, Jr. et al. |
| 2019/0365507 A1 | 12/2019 | Khoshnevis et al. |
| 2020/0000551 A1 | 1/2020 | Li et al. |
| 2020/0066391 A1 | 2/2020 | Sachdeva et al. |
| 2020/0107911 A1 | 4/2020 | Roein Peikar et al. |
| 2020/0129272 A1 | 4/2020 | Roein Peikar et al. |

(56) References Cited

U.S. PATENT DOCUMENTS

| | | |
|---|---|---|
| 2020/0138549 A1 | 5/2020 | Chun et al. |
| 2020/0146779 A1 | 5/2020 | Zhang |
| 2020/0146791 A1 | 5/2020 | Schülke et al. |
| 2020/0188063 A1 | 6/2020 | Cinader, Jr. et al. |
| 2020/0229903 A1 | 7/2020 | Sandwick |
| 2020/0275996 A1 | 9/2020 | Tong et al. |
| 2020/0345455 A1 | 11/2020 | Peikar et al. |
| 2020/0345459 A1 | 11/2020 | Schueller et al. |
| 2020/0345460 A1 | 11/2020 | Peikar et al. |
| 2020/0352765 A1 | 11/2020 | Lin |
| 2020/0375699 A1 | 12/2020 | Roein Peikar et al. |
| 2020/0390524 A1 | 12/2020 | Peikar et al. |
| 2020/0405191 A1 | 12/2020 | Lotan et al. |
| 2020/0405452 A1 | 12/2020 | Song et al. |
| 2021/0007830 A1 | 1/2021 | Peikar et al. |
| 2021/0007832 A1 | 1/2021 | Roein Peikar et al. |
| 2021/0068928 A1 | 3/2021 | Witte et al. |
| 2021/0093422 A1 | 4/2021 | Tong et al. |
| 2021/0128275 A1 | 5/2021 | Suh et al. |
| 2021/0134450 A1 | 5/2021 | Katzman et al. |
| 2021/0137644 A1 | 5/2021 | Benarouch et al. |
| 2021/0145547 A1 | 5/2021 | Roein Peikar et al. |
| 2021/0177551 A1 | 6/2021 | Roein Peikar et al. |
| 2021/0186662 A1 | 6/2021 | Roein Peikar et al. |
| 2021/0205049 A1 | 7/2021 | Cinader, Jr. |
| 2021/0212803 A1 | 7/2021 | Tong et al. |
| 2021/0244505 A1 | 8/2021 | Tong et al. |
| 2021/0244507 A1 | 8/2021 | Curiel et al. |
| 2021/0251730 A1 | 8/2021 | Curiel et al. |
| 2021/0330430 A1 | 10/2021 | Khoshnevis et al. |
| 2021/0338380 A1 | 11/2021 | Park et al. |
| 2021/0346127 A1 | 11/2021 | Cassalia |
| 2021/0353389 A1 | 11/2021 | Peikar et al. |
| 2021/0401548 A1 | 12/2021 | Oda et al. |
| 2022/0008169 A1 | 1/2022 | Reisman |
| 2022/0023009 A1 | 1/2022 | Tong et al. |
| 2022/0031428 A1 | 2/2022 | Khoshnevis et al. |
| 2022/0039922 A1 | 2/2022 | Yamaguchi |
| 2022/0061964 A1 | 3/2022 | Khoshnevis et al. |
| 2022/0087783 A1 | 3/2022 | Khoshnevis et al. |
| 2022/0133438 A1 | 5/2022 | Wratten, Jr. et al. |
| 2022/0168072 A1 | 6/2022 | Tong et al. |
| 2022/0183797 A1 | 6/2022 | Khoshnevis et al. |
| 2022/0226076 A1 | 7/2022 | Roein Peikar et al. |
| 2022/0226077 A1 | 7/2022 | Roein Peikar et al. |

FOREIGN PATENT DOCUMENTS

| | | |
|---|---|---|
| CN | 201320224 Y | 10/2009 |
| CN | 102215773 | 10/2011 |
| CN | 202365955 | 8/2012 |
| CN | 202892116 | 4/2013 |
| CN | 203074896 | 7/2013 |
| CN | 103505293 | 1/2014 |
| CN | 203506900 | 4/2014 |
| CN | 104188728 | 12/2014 |
| CN | 204049881 | 12/2014 |
| CN | 205126459 | 4/2016 |
| CN | 105596098 | 5/2016 |
| CN | 105662615 | 6/2016 |
| CN | 205569100 | 9/2016 |
| CN | 106029002 | 10/2016 |
| CN | 106137419 | 11/2016 |
| DE | 3915807 | 11/1990 |
| DE | 20 2018 003 574 U1 | 8/2018 |
| DE | 10 2018 005 769 A1 | 1/2020 |
| DE | 10 2018 133 705 A1 | 7/2020 |
| DE | 10 2015 017 301 B3 | 3/2022 |
| EP | 1139902 | 10/2001 |
| EP | 1276433 | 1/2003 |
| EP | 1 379 193 B1 | 2/2007 |
| EP | 2076207 | 7/2009 |
| EP | 1 073 378 B1 | 1/2012 |
| EP | 2522298 | 11/2012 |
| EP | 2617383 | 7/2013 |
| ES | 2315046 | 4/2010 |
| FR | 2 525 469 | 10/1983 |
| FR | 3 056 393 B1 | 10/2018 |
| JP | 2009205330 A | 9/2009 |
| KR | 100549294 | 1/2006 |
| KR | 100737442 | 7/2007 |
| KR | 100925286 | 5/2009 |
| KR | 101583547 | 1/2016 |
| KR | 101584737 | 1/2016 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 03/045266 | 6/2003 |
| WO | WO 2005/008441 | 1/2005 |
| WO | WO 2005/094716 | 10/2005 |
| WO | WO 2007/069286 | 6/2007 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2014/070920 | 5/2014 |
| WO | WO 2016/148961 | 9/2016 |
| WO | WO 2016/149008 | 9/2016 |
| WO | WO 2016/199972 | 12/2016 |
| WO | WO 2016/210402 | 12/2016 |
| WO | WO 2017/007079 | 1/2017 |
| WO | WO 2017/112004 | 6/2017 |
| WO | WO 2017/184632 | 10/2017 |
| WO | WO 2017/194478 A1 | 11/2017 |
| WO | WO 2017/198640 A1 | 11/2017 |
| WO | WO 2018/102588 | 6/2018 |
| WO | WO 2018122862 A1 | 7/2018 |
| WO | WO 2018/144634 | 8/2018 |
| WO | WO 2018/195356 | 10/2018 |
| WO | WO 2019/135504 | 7/2019 |
| WO | WO 2020/095182 | 5/2020 |
| WO | WO 2020/178353 | 9/2020 |
| WO | WO 2020/180740 | 9/2020 |
| WO | WO 2020/223744 | 11/2020 |
| WO | WO 2020/223745 | 11/2020 |
| WO | WO 2021/087158 | 5/2021 |
| WO | WO 2021/105878 | 6/2021 |
| WO | WO 2021/214613 | 10/2021 |
| WO | WO 2021/225916 A2 | 11/2021 |
| WO | WO 2021/226618 | 11/2021 |
| WO | WO 2021/225916 A3 | 12/2021 |
| WO | WO 2021/252675 | 12/2021 |
| WO | WO 2022/099263 | 5/2022 |
| WO | WO 2022/099267 | 5/2022 |

OTHER PUBLICATIONS

Coro, Jorge C et al., "MEAW Therapy" MEAW Therapy-Orthodontic Products, accessed via http://www.orthodonticproductsonline.com/2012/11/meaw-therapy/on Mar. 14, 2016, published Nov. 12, 2012 in 6 pages.

ElSheikh, Moaaz Mohamed, et al. "A Forsus Distalizer: a Pilot Typodont Study". Jul.-Dec. 2004, KDJ, vol. 7, No. 2, pp. 107-115.

EP Search Report dated Jun. 23, 2016 in EP application No. 13850778.5 in 5 pages.

Gilbert, Alfredo. An in-office wire-bending robot for lingual orthodontics. ResearchGate. Article in Journal of clinical orthodontics: JCO, Apr. 2011.

Glauser-Williams Orthodontics: Appliances, http://www.glauserwilliamsorthodontics.com/treatments/orthodontic-appliances.php, accessed Nov. 30, 2015 in 4 pages.

Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.

Jiang et al. A Review on Robot in Prosthodontics and Orthodontics. Hindawi Publishing Corporation. Advances in Mechanical Engineering. Article ID 198748. 2014. 11 pages.

(56) References Cited

OTHER PUBLICATIONS

Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).

Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.

SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).

Xia, et al. Development of a Robotic System for Orthodontic Archwire Bending. 2016 IEEE International Conference on Robotics and Automation (ICRA). Stockholm, Sweden, May 16-21, 2016. pp. 730-735.

Yang, Won-Sik, et al. "A Study of the Regional Load Deflection Rate of Multiloop Edgewise Arch Wire." Angle Orthodontist, 2001, vol. 7, No. 2, pp. 103-109.

International Search Report for International Application No. PCT/US2013/067560 dated Feb. 14, 2014.

International Search Report for International Application No. PCT/US2017/028180 dated Aug. 14, 2017.

International Search Report and Written Opinion for International Application No. PCT/US 2017/064021 dated Mar. 6, 2018.

International Search Report for International Application No. PCT/US2018/016293 dated May 10, 2018.

International Search Report for International Application No. PCT/US2018/028437 dated Aug. 9, 2018.

IPhone 3D scanning to dental software, screen shots at 0:09 and 7:00 of YouTube video, https://www.youtube.com/watch?v=QONGdQ3QiFE, uploaded Oct. 1, 2018 in 2 pages.

Invisalign® SmileView™, How Would You Look with Straight Teeth?, https://www.invisalign.com/get-started/invisalign-smiieview?v=0#start, printed Jun. 7, 2022 in 2 pages.

A ScanBox demo, https://www.youtube.com/watch?v=MsCfv2PDQOo, screen shots at 0:08 and 0:19 of YouTube video, uploaded May 5, 2019 in 2 pages.

Southern Maine Orthodontics, Virtual Orthodontic Treatment, https://southernmainebraces.com/virtual-orthodontic-treatment/, printed Jun. 7, 2022 in 3 pages.

* cited by examiner

FIG. 3

METHOD OF TONGUE PRECONDITIONING IN PREPARATION FOR LINGUAL ORTHODONTIC TREATMENT

BACKGROUND

Field of the Invention

This invention relates in some aspects to orthodontic appliances, including methods for tongue preconditioning prior to the placement of orthodontic appliances such as brackets and archwires.

SUMMARY

In some embodiments, disclosed herein is a method of preconditioning the lingual tissue of a patient for orthodontic treatment. The method includes coupling one or more protuberances to the lingual surfaces of one or more of the patient's teeth; allowing the lingual tissue to adapt to the presence of the one or more protuberances; decoupling the one or more protuberances from the lingual surfaces of the one or more teeth; and applying one or more orthodontic appliances to the lingual surfaces of one or more of the patient's teeth subsequent to the decoupling of the one or more protuberances.

The protuberances may comprise any suitable material. For example, the protuberances can be fabricated from metal, polymer, and/or ceramic. The protuberances may be affixed to the lingual surfaces of teeth using a standard orthodontic adhesive. The protuberances can have a smooth distal end, which may be flat and/or rounded, for contacting the patient's lingual tissue. In some embodiments, the protuberances may be formed in situ. The protuberances may be formed from a curable (e.g., photo-curable) resin and can be further shaped after curing. The protuberances may be repurposed orthodontic buttons. In some embodiments, the protuberances are specifically configured to imitate the subsequently applied orthodontic appliance. The protuberances may have the same hardness as the orthodontic appliance. The protuberances may be softer than the orthodontic appliance. The protuberances may generally have smooth and rounded edges. The protuberances may have the same size and/or dimensions as the subsequently applied orthodontic appliance. The protuberances may have reduced or diminished profiles compared to the orthodontic appliance or may have larger sizes and profiles compared to the orthodontic appliance.

The protuberances may be applied to the same teeth expected to receive orthodontic appliances and/or to different teeth. Any number of protuberances may be applied, for example one protuberance, one protuberance per every few teeth, one protuberance per tooth, more than one protuberance per tooth, or any number in between. The protuberances may be placed on teeth uniformly across the mouth or may be localized to teeth within certain areas of the mouth. The protuberances may be applied one, two, three, four, five weeks or more prior to the introduction of the orthodontic appliance. The protuberances can be removed immediately prior to, one to several days prior to, or, in some instances, subsequently to the introduction of the orthodontic appliance. The protuberances applied in a given treatment may be the same as each other or different from each other. In some embodiments, protuberances may be applied according to a dynamic protocol, in which protuberances are replaced, removed, and/or added across several visits prior to the introduction of the orthodontic appliance. The protuberances may provide an intermediate sensation level relative to the orthodontic appliance and/or provide a graduated adaptation to the orthodontic appliance.

In one aspect of the invention, disclosed is a method of preconditioning the lingual tissue of a patient for orthodontic treatment. The method includes coupling one or more protuberances to the lingual surfaces of one or more of the patient's teeth; allowing the lingual tissue to adapt to the presence of the one or more protuberances; decoupling the one or more protuberances from the lingual surfaces of the one or more teeth; and applying one or more orthodontic appliances to the lingual surfaces of one or more of the patient's teeth subsequent to the decoupling of the one or more protuberances.

In some embodiments, the protuberances may not be configured to facilitate in the realigning of the patient's teeth. The one or more orthodontic appliances may be lingual braces comprising a plurality of brackets and at least one archwire. Applying the one or more orthodontic appliances may include placing an orthodontic component on at least one of the one or more teeth from which the one or more protuberances were decoupled. Applying the one or more orthodontic appliances may include placing an orthodontic component on each of the one or more teeth from which the one or more protuberances were decoupled.

Allowing the lingual tissue to adapt may include leaving the one or more protuberances in place for at least one week, at least two weeks, at least three weeks, or at least four weeks. Allowing the lingual tissue to adapt may include leaving the one or more protuberances in place for no longer than two months, no longer than six weeks, or no longer than four weeks.

The one or more protuberances may comprise metal. The one or more protuberances may be orthodontic buttons. The one or more protuberances may comprise one or more polymers. Coupling the one or more protuberances may comprise applying an adhesive to the lingual surfaces of the one or more of the patient's teeth. Coupling the one or more protuberances may comprise forming the one or more protuberances in situ on the lingual surfaces of the one or more of the patient's teeth. Forming the one or more protuberances in situ may include depositing a resin on the lingual surfaces of the one or more of the patient's teeth and photo-curing the resin. Forming the one or more protuberances may include shaping the protuberance in situ after the resin has been cured. The one or more protuberances may be softer than the one or more orthodontic appliances.

The one or more protuberances may each include a proximal end and a distal end and coupling the one or more protuberances may include adhering the proximal ends to the lingual surface of the one or more of the patient's teeth. The distal end of each protuberance may be flat or rounded. The one or more protuberances may include at least two protuberances. Decoupling the one or more protuberances and applying the one or more orthodontic appliances may both occur within twenty-four hours.

BRIEF DESCRIPTION OF THE DRAWINGS

These drawings are illustrative embodiments and do not present all possible embodiments of this invention.

DETAILED DESCRIPTION

Orthodontic appliances are used to correct malocclusion of the teeth and may be affixed to a person's teeth for an extended period of time (e.g., months to years) as necessary to gradually realign one or more teeth. Lingual braces which apply brackets to the lingual (i.e. inner) sides of the teeth, as opposed to the buccal (i.e. outer) sides of the teeth, offer several advantages. Primarily, lingual braces hide the orthodontic appliance from the plain view of others, as the orthodontic appliances are positioned behind the teeth of the orthodontic patient, giving the braces an "invisible" quality. They also hide any white spot lesions that may be left behind on the tooth after removal of the orthodontic appliance. However, a transient challenge with lingual orthodontic appliances, such as lingual braces, can be the adjustment of the patient's tongue to the new sensation of foreign structures within the mouth, especially structures on the lingual side of the teeth which are more frequently felt by the tongue. It may take several weeks (e.g., 2-3 weeks) for a patient's tongue to adapt to the presence of lingual braces. During this time, orthodontic appliances, particularly lingual appliances, may irritate the tongue (e.g., cause pain) and interfere with speech and/or eating, both functions for which the tongue is highly involved. The tongue is a muscular organ which also functions to help clean the teeth. Therefore, even in a resting state, a portion of the tongue is likely in physical contact with the lingual sides of multiple teeth. Thus, the abrupt introduction of an orthodontic appliance, which may comprise multiple components such as brackets and archwires, may provide severe and persistent discomfort, irritation, and/or annoyance to the patient, until the tongue has sufficiently adjusted. Orthodontic appliances may be made smaller and/or made with smoother profiles to reduce irritation and other effects of the appliance on the patient's teeth. However, these changes cannot completely eliminate the effect of the appliance's introduction into the mouth on the patient's tongue. Furthermore, the functional requirements of the orthodontic appliance may preclude making otherwise optimal and/or drastic alterations to the appliance for the purpose of reducing detectability of the appliance by the tongue. For example, many orthodontic appliances are fabricated from metal components, which may be especially irritating to the tongue given the hardness of the metal. However, the structural properties of the metal (e.g., the strength or rigidity) may be desirable for functionally realigning the patient's teeth. Similarly, complex geometries of a bracket or an archwire may serve an important functional purpose which prevents the geometries from being readily modified.

Disclosed herein are devices, systems, and methods for preconditioning a tongue to foreign orthodontic structures introduced into the oral cavity. The disclosed embodiments may be used to allow the tongue to more gradually adapt to the presence of an orthodontic appliance. The disclosed embodiments are particularly useful for preconditioning the tongue in preparation for the application of lingual orthodontic appliances.

Figure 1:
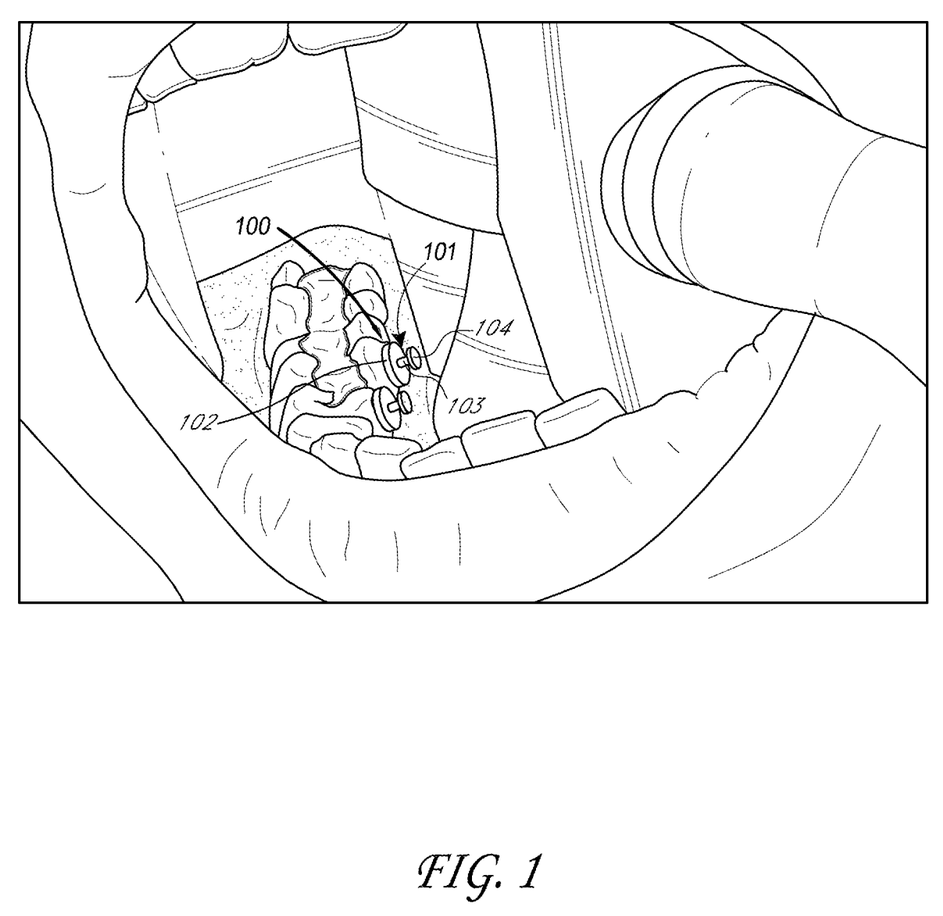
FIG. 1 illustrates an image of a patient's mouth in which two protuberances have been placed on the lingual surfaces of two of the patient's teeth.

The devices disclosed herein may include one or more protuberances which are configured to be applied to one or more surfaces of a patient's teeth. In some embodiments, the protuberance is a prefabricated structure which can be affixed (e.g., bonded) to the patient's tooth. FIG. 1 illustrates an image of a patient's mouth, in which examples of two metal lingual protuberances 100 have been bonded to the lingual surfaces of two adjacent teeth to precondition the patient's tongue for lingual orthodontic treatment. The protuberance may comprise a generally flat adhesion surface for coupling to the tooth. The generally flat adhesion surface may comprise a textured surface (e.g., knurled, bumped, ridged, etc.) for increasing surface area for an adhesive and promoting a stronger bond to the tooth. In some embodiments, the generally flat adhesion surface may be smooth. The protuberance may comprise a projection 101 extending from the generally flat adhesion surface. The projection 101 may comprise a smooth, generally flat distal end or a smooth, generally rounded distal end for interacting with the tongue (the generally flat adhesion surface comprising a proximal end). The smooth surface of the projection 101 may provide a minimally irritating geometry for the tongue to contact. Minimally irritating geometries may be desirable for gradually inducing the tongue to adapt to the presence of an orthodontic appliance.

In some embodiments, the projection 101 may extend from the edges of an outer circumference of the generally flat surface directly to a distal end the projection, such that the protuberance 100 is generally bullet-shaped, dome shaped, or cylindrical shaped. In some embodiments, the proximal end of the protuberance 100 may comprise a thin tab 102 comprising the generally flat dental-facing adhesion surface on one side and a flat smooth lingual-facing surface on the opposite side from which the protrusion extends, as shown in FIG. 1. The thin tab 102 may be circular, as in FIG. 1, or may be any other shape (e.g., rectangular, polygonal, oblong, etc.). The protrusion 101 may extend from a portion of the smooth lingual-facing surface, such as the center of the lingual-facing surface so that the lingual-facing surface is generally annular to the protrusion. A tab configuration may provide a larger surface area for bonding the protuberance 100 to a tooth while allowing independent control over the size of the protrusion. The smooth lingual-facing surface of the tab may provide a minimally detectable structure. In some implementations, the tab may comprise apertures extending through the tab from the dental-facing adhesion surface to the lingual-facing surface. The apertures may be configured to allow improved bonding by providing more surface area for an adhesive to affix to the protuberance 100. In some embodiments, the projection may comprise a post 103 (e.g., a cylindrical post) with a bulb 104 at the distal end. The bulb 104 may have a larger diameter than the post 103. The bulb 104 can include the smooth generally flat distal end, as in FIG. 1, or a rounded distal end configured to contact the tongue. The tongue may be able to detect other portions of the protuberance 100 proximal to the distal end as well. In many embodiments, the distal end of the protuberance 100 will be the most detectable portion of the protuberance 100.

The radius of curvature of a generally rounded distal end may be configured to modulate the detectability (e.g., noticeability or the amount of irritation) of the protuberance by the tongue. A smaller radius of curvature may produce a more "pointed" distal end which may be more detectable by the tongue than a larger radius of curvature. The length of the protuberance, the general diameter of the protuberance, and/or the shape of the protuberance surface, particularly the distal end of the protuberance (including the radius of curvature) may be used to modulate the detectability and feel of the protuberance by the tongue (e.g., lingual tissue). In some embodiments, the distal end may be rounded with a generally flat surface positioned at the apex of the protrusion.

In some embodiments, the protuberance may comprise more complex geometries. The protuberance may comprise shapes such as cuboids, pyramids, cones, etc. In some implementations the protuberance may comprise non-round geometries with rounded edges and/or corners to avoid cutting, puncturing, and/or injuring the lingual tissue. The protuberances may comprise multiple protrusions. In some embodiments, the protuberances may be fabricated in size and/or shape to more closely resemble the anticipated orthodontic appliance (e.g., bracket). The protuberance may be the same or similar to the structure and/or geometry of the orthodontic appliance. The length, size, shape, footprint (e.g., on the dental surface), and/or rigidity of the protuberance may be selected to match that of the anticipated orthodontic appliance or to provide a subtler (e.g., diminished or smoother) placeholder for the anticipated orthodontic appliance. In some implementations, the protuberance resembles the orthodontic appliance but is comprised of a softer (e.g., an elastomeric material). In some implementations, the protuberance comprises a similar size and/or overall shape to the orthodontic appliance, but comprises a reduced profile or rounded edges. In some implementations, the protuberance may not be related to the specific orthodontic appliance at all (e.g., it may be a general use protuberance and/or a repurposed orthodontic button).

In some embodiments, the protuberance may comprise multiple protrusions extending from multiple (e.g., adjacent) teeth which are joined by an intervening structure. The intervening structure may resemble, for example, an archwire. The intervening structure may be made from the same or different materials as the protrusions. For example, the intervening structure may be metal or it may be a softer elastomeric rubber or plastic. The protrusions and the intervening structure may be integrally formed or assembled prior to or after placement of the protrusions on the teeth.

The protuberances may be fabricated from any suitable material (e.g., non-toxic). The protuberances may be generally tasteless to the user. The protuberances may provide a subtle, generally pleasant taste. The protuberances may be made from a single material, a composite of materials, or comprise portions fabricated from different materials. The protuberances may be fabricated from the same material(s) as the orthodontic appliance for which the tongue is being preconditioned. For example, the protuberances may be fabricated from metal (e.g., stainless steel, titanium, nitinol, etc.). The protuberances can also comprise polymer-based materials (including plastics, rubbers, and/or hydrogels) and/or ceramics. In some embodiments, the protuberances may be fabricated from a softer material than the orthodontic appliance, in order to provide an intermediate level of irritation or detectability for the tongue to adjust to prior to introduction of the orthodontic appliance, which generally comprises metal. For example, the protuberance(s) may be a soft or semi-rigid rubber used to precondition the tongue for the application of metal brackets and/or a metal archwire. Polymer based-materials may provide a large range of structural properties depending, for example, on cross-link densities, molecular weights, curing protocols, etc.

Pre-fabricated protuberances can be bonded to a patient's teeth using any standard dental/orthodontic adhesive (e.g., resin or glue). The adhesive may be a curable adhesive. In some implementations, the adhesive is a photo-curable adhesive that is solidified by application of certain wavelengths of light, which may be provided by a standard dental or orthodontic instrument. The protuberance can be affixed to the tooth in the same manner as an orthodontic appliance (e.g., a bracket).

In some embodiments, the protuberance is not pre-fabricated but formed directly on the surface of the tooth. For example, the protuberance may be formed from an adhesive resin, such as a resin used to adhere pre-fabricated protuberances or orthodontic appliances to the surfaces of teeth and/or to provide tooth filler material. The resin may be directly applied to (e.g., injected onto) a surface of a tooth, such as the lingual surface, formed into an appropriate shape, and cured. The resin may be formed into a generally globular shape or other rounded configuration. The resin can be further shaped after curing. For example, the hardened resin may be shaved, cut, drilled, polished, compressed, heated, molded, etc. to shape the resin into an appropriate protuberance configuration. The resin may be configured to be suitably thick and/or viscous prior to curing so that it may be at least partially shaped into a desired configuration without losing shape and/or sliding off the tooth surface prior to curing. In some embodiments, additional components (e.g., plasticizers) may be added to standard adhesive resins to adjust the physical properties of the resin and configure them for shaping into protuberances. In some embodiments, the curable adhesive resin may be a combination of a standard curing adhesive, or another type of adhesive, and other polymers for providing other physical properties to the protuberance. The other components may, for example, modulate the rigidity/elasticity, toughness, porosity, curing time, etc.

Systems incorporating the protuberances may use one or more protuberances strategically positioned on the teeth. In implementations where multiple protuberances are employed, the protuberances may be identical or similar to each other or protuberances of different sizes, shapes, and/or configurations may be used. In some implementations, the protuberances may be standard orthodontic appliances (e.g., buttons that are used for anchoring orthodontic components, including metal buttons for anchoring metal braces and resin buttons for anchoring invisible aligners) which may be repurposed in accordance with the systems and methods disclosed herein.

In some embodiments, protuberances may be applied to each tooth that is expected to receive an orthodontic bracket. The protuberances may be placed in approximately the same position the bracket is planned to be placed or may be placed in an alternative position on the surface of the tooth. In some embodiments, the protuberances may be placed on fewer than the number of teeth expected to receive orthodontic attachments. In some embodiments, the protuberances may be placed on more teeth than are expected to receive orthodontic attachments. The number of protuberances employed may be unrelated to the number of teeth expected to receive orthodontic appliances. The orthodontist may generally space the protuberances across the teeth according to an adjustment strategy. For example, the protuberances may be uniformly spaced across the teeth to generally provide stimuli for all portions of the lingual tissue. The orthodontist may employ as few protuberances as needed to adequately stimulate all portions of the tongue. For example, the orthodontist may place a protuberance on every other tooth, every three teeth, etc.

In some embodiments, the orthodontist may place a higher number of protuberances to over-stimulate the tongue. For example, the orthodontist may employ higher number of protuberances which are relatively less irritating to promote a higher degree of adaption (e.g., keratinization) of the tongue. Alternatively, the orthodontist may employ a lower number of relatively more irritating protuberances to promote a desired degree of adaptation. Protuberances may be employed on the lower teeth, upper teeth, or both. Providing protuberances on either the upper or lower set of teeth may be sufficient to promote the desired adaption. In some implementations, the orthodontist may alternate applying protuberances between upper and lower teeth for a given type of tooth or tooth position (e.g., as located medially-to-distally on the left and right sides of the mouth). In some embodiments, the orthodontist may choose placements of protuberances that are configured to target more sensitive parts of the tongue. In some embodiments, the orthodontist may choose placements that are configured to target less sensitive parts of the tongue.

In some implementations, the protuberances are placed after the development of a patient-specific orthodontic treatment plan. The development of the orthodontic treatment plan may comprise several steps. The patient's teeth may be manually examined by an orthodontist (or dentist). X-rays of the patient's teeth may be taken. Other suitable imaging means may be used to visualize the patient's teeth as well, including optical 3D scanning. A computational model and/or physical model of the patient's teeth may be generated. For example, a digital model can be created from images of the patient's teeth and a physical model may be fabricated from the digital model, through means such as 3D printing or other suitable techniques. The model may include one or more teeth, all the teeth, portions of gingival tissue, portions of the jaw, etc. Computational and/or physical models of the patient's teeth may be adjusted into a target and/or corrected form. Models of intermediate forms between the imaged malocclusion state of the teeth and the final form may be generated as well. The selection of appropriate orthodontic appliances and the anticipated placement and/or positioning of the orthodontic appliances on the patient's teeth may be determined prior to placement of the protuberances. The orthodontic treatment plan may be entirely or partly determined by computational means or may be entirely or partly determined by the orthodontist's own judgment. As described elsewhere herein, the placement of the protuberances may or may not relate to the placement of the orthodontic appliances. In some implementations, the protuberances are placed prior to the development of a specific orthodontic treatment plan. For example, the orthodontist may examine the patient, including imaging the patient's teeth, place the protuberances, and develop the orthodontic treatment plan while the protuberances are in place and the patient's tongue has begun adapting.

The protuberances may be placed on the teeth in the same manner as any standard orthodontic appliance (e.g., bracket). Pre-fabricated protuberances may, for example, be individually applied to each tooth or they may be indirectly bonded. In indirectly bonding, the protuberances may be placed in a tray which is applied to multiple teeth all at once to adhere the protuberances to the teeth. In some implementations, sections of trays may be used to apply the protuberances to a portion of the patient's teeth. In some embodiments, the protuberance may be formed in situ, as described elsewhere herein. For example, the orthodontist may use a syringe to inject a droplet of photo-curable resin onto the lingual surface of a patient's tooth. The orthodontist may use an instrument to roughly shape (e.g., round, flatten, or smooth) the droplet. The orthodontist may insert a light-delivery instrument into the patient's mouth and shine the light on the resin until the resin has cured to form a protuberance of a desired stiffness, which is adequately affixed to the surface of the patient's tooth. The orthodontist may then use other instruments (e.g., a drill and a polisher) to shape the protuberance into the desired shape. For example, the orthodontist may shave the protuberance into a cylindrical-shaped, dome-shaped, or bullet-shaped protrusion then polish the surface of the protrusion to create a smooth surface with no sharp or jagged edges.

The orthodontist may place the protuberances on the patient's teeth an appropriate amount of time before the delivery of the orthodontic appliance to allow the patient's mouth, particularly the lingual tissue, to adjust to the protuberance. The protuberances may be for applied approximately, at least about, or no more than about: one week prior to orthodontic treatment, two weeks prior to orthodontic treatment, three weeks prior to orthodontic treatment, four weeks prior to orthodontic treatment, five weeks prior to orthodontic treatment, ranges in between, etc. In some embodiments, the protuberances may be applied more than five weeks prior to orthodontic treatment. In some embodiments, the protuberances may be applied less than one week prior to orthodontic treatment, such as 1, 2, 3, 4, 5, or 6 days before orthodontic treatment. In some embodiments, two to four weeks may provide sufficient time to allow the patient's lingual tissue to adjust to the protuberances. The amount of time allowed for adequate adjustment may depend on the type and/or number of protuberances applied and/or the type of orthodontic appliance that will be introduced. In some embodiments, the orthodontist will remove the protuberances from the teeth immediately prior to introducing the orthodontic appliance(s) for which the tongue was preconditioned. The orthodontist may remove the protuberances in the same manner as removing any other orthodontic appliance and/or adhesive/resin from a patient's tooth. For example, the orthodontist may use a drill, pliers, polisher, and other standard tools to remove the appliance and/or any adhesive resin adhered to the tooth. The orthodontist may clean the surface of the tooth before applying the orthodontic appliance. In some embodiments, the orthodontist may remove the protuberances one or more days before introducing the orthodontic treatment. The amount of time between removal of the protuberances and the introduction of the orthodontic appliance may be short enough such that the lingual tissue does not readapt to the absence of foreign structures in the mouth.

In some embodiments, the orthodontist may apply a dynamic preconditioning protocol. For example, the orthodontist may gradually introduce more protuberances to the patient's teeth over the course of several visits (e.g., two visits, three visits, etc.). For another example, the orthodontist may transition from less detectable protuberances to more detectable (e.g., more severe) protuberances to promote a more gradual adaptation of the lingual tissue. In some instances, the protuberances may be replaced with protuberances of different sizes, shapes, and/or material properties (e.g., stiffness). In some instances, more detectable protuberances may be added in addition to the less detectable protuberances. In some embodiments, the protuberances are configured to change characteristics in situ, such as being volumetrically expandable, e.g., fillable with a filler, or expand by absorbing fluid from the patient's oral cavity. In some embodiments, the protuberances are degradable, e.g., biodegradable over time and can naturally disappear. The more detectable protuberances may be positioned on distinct teeth from the less detectable protuberances, may be positioned on the same teeth adjacent to the less detectable protuberances, or may be positioned over top the less detectable protuberances. In some embodiments, protuberances may be configured to be coupled (e.g. mated together), such that, for example, a more detectable protuberance can be configured as a shell which may be readily placed over the less detectable protuberance, allowing a quicker procedure. Coupled protuberances may be able to be removed from the surface of the tooth altogether. In some implementations, all the protuberances may be removed during a single visit. Other dynamic protocols are contemplated as well. Multiple visits within a dynamic preconditioning protocol may be spaced uniformly across the total preconditioning period (e.g., one visit per week, one visit every two weeks, etc.). In some embodiments, the visits may be spaced non-uniformly. For example, the visits, and accompanying protuberance swaps, removals, and/or additions, may be concentrated toward the beginning of the preconditioning period, toward the middle of the preconditioning period, toward the end of the preconditioning period, or any combination thereof.

The protuberance may be configured for general use or may be specifically configured for a specific orthodontic appliance. In some implementations, the protuberance may be configured to mate with the orthodontic appliance such that it provides a base support for coupling the orthodontic appliance to the tooth, while also serving to precondition the lingual tissue prior to introduction of the orthodontic appliance. For example, the protuberance may be configured as a button to which an orthodontic bracket may be secured (e.g., snapped onto or glued onto). Such complementary configurations may allow a more streamlined procedure in which the protuberance is applied first and in a subsequent visit the orthodontic appliance is more quickly applied to the teeth without needing to remove the protuberance. In some implementations, where the protuberance neither cooperates with nor interferes with the placement of the orthodontic appliance, the orthodontic appliance may be removed subsequently to the placement of the orthodontic appliance.

Not to be limited by theory, but the placement of the protuberances, particularly on the lingual surfaces of teeth, in some embodiments, may gradually promote adaptation of the patient's tongue by stimulating keratinization of the patient's lingual tissue. Keratin is a fibrous structural protein that protects epithelial cells from damage and/or stress. Keratin is found in various tissues, including skin, nails, hair, etc., and coats the tongue. By way of non-limiting example, the protuberances may promote accumulation and/or hardening of keratin on the tongue's surface, making the tongue tougher and/or less sensitive to the protuberances and/or subsequently placed orthodontic appliances. The protuberances may stimulate other physiological changes within the lingual tissue that adapt the tissue to the presence of the protuberances and precondition the tissue for orthodontic treatment. The protuberances may act to promote adaptation by other means as well. For example, the protuberances may psychologically condition the patient to adjust to the presence of orthodontic appliances in the mouth. The persistent stimulation of lingual tissue may gradually produce a diminished neurological response (e.g., stimulation) as the nervous system of the patient adapts or desensitizes to the presence of the protuberances. The tongue may gradually be retrained to operate, such as in speaking and eating, in the presence of the protuberances and/or orthodontic appliances. The patient can, in some embodiments, feel less pain or discomfort from the subsequent orthodontic appliances as a result of the placement of the protuberances ahead of time. Other modes of adaptation are contemplated as well. In some embodiments, the protuberances may be applied to other surfaces of the teeth (e.g., buccal) and/or used to precondition other oral tissue (e.g., buccal, gingival, labial, etc.) for orthodontic treatment.

Various other modifications, adaptations, and alternative designs are of course possible in light of the above teachings. For example, features including brackets disclosed in U.S. Pub. No. 2014/0120491 A1 to Khoshnevis et al., hereby incorporated by reference in its entirety, can be utilized or modified or use with embodiments as disclosed herein. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "placing a protuberance" includes "instructing the placing of a protuberance." The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Figure 2:
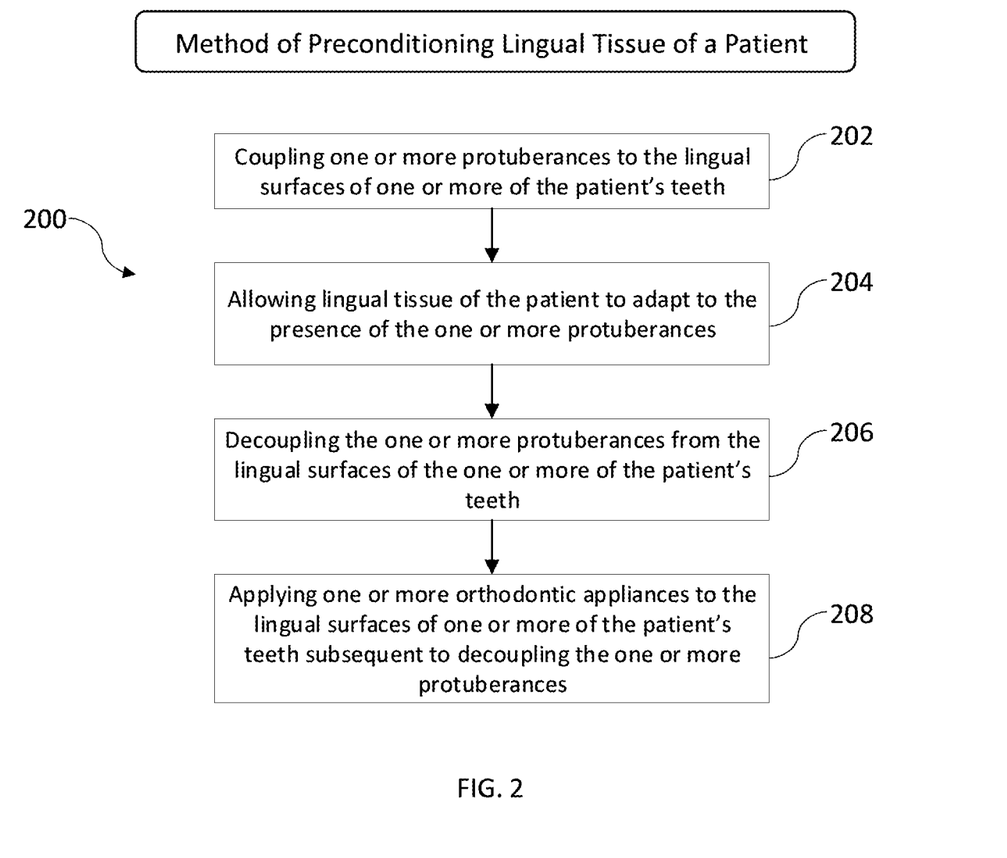
FIG. 2 illustrates a method of preconditioning lingual tissue of a patient.

FIG. 2 illustrates a method 200 of preconditioning lingual tissue (e.g., the tongue) of a patient. At block 202, one or more protuberances can be coupled (e.g., adhered with an adhesive) to the surfaces of one or more of the patient's teeth. At block 204, the method 200 can include allowing lingual tissue of the patient to adapt to the presence of the one or more protuberances. At block 206, the method 200 can include decoupling the one or more protuberances from the lingual surfaces of the one or more of the patient's teeth. At block 208, the method 200 can include applying one or more orthodontic appliances to the lingual surfaces of one or more of the patient's teeth subsequent to decoupling the one or more protuberances.

Figure 3:
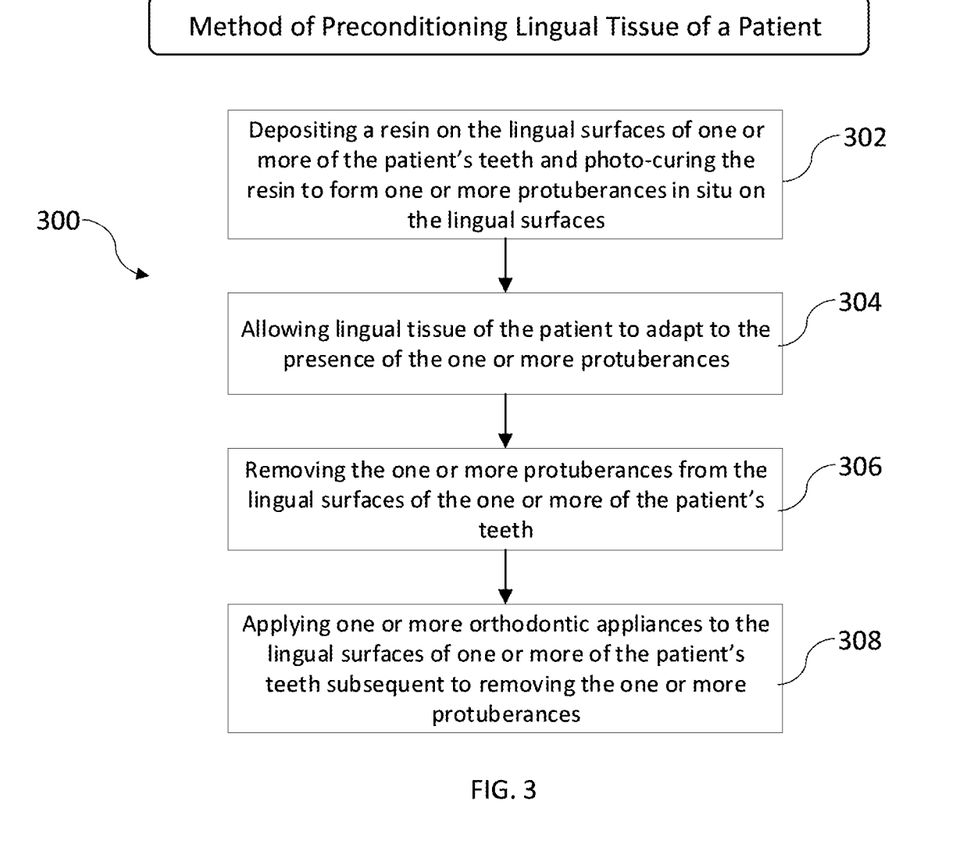
FIG. 3 illustrates a method of preconditioning lingual tissue of a patient.

FIG. 3 illustrates a method 300 of preconditioning lingual tissue (e.g., the tongue) of a patient. At block 302, the method 300 can include depositing a resin on the lingual surfaces of one or more of the patient's teeth and photo-curing the resign to form one or more protuberances in situ on the lingual surfaces. At block 304, the method 300 can include allowing lingual tissue of the patient to adapt to the presence of the one or more protuberances. At block 306, the method 300 can include removing the one or more protuberances from the lingual surfaces of the one or more of the patient's teeth. At block 308, the method 300 can include applying one or more orthodontic appliances to the lingual surfaces of one or more of the patient's teeth subsequent to removing the one or more protuberances.

What is claimed is:

1. A method of preconditioning a tongue of a patient for orthodontic treatment, the method comprising:
   adhering a first protuberance to a first lingual surface of a first tooth of the patient with adhesive, the first protuberance comprising a distal free end spaced away from the first lingual surface that is configured to contact the tongue;
   adhering a separate second protuberance to a second lingual surface of a second tooth of the patient with adhesive, the second protuberance comprising a distal free end spaced away from the second lingual surface that is configured to contact the tongue;
   allowing the tongue to adapt to a presence of the first and second protuberances for a duration of time to precondition the tongue for orthodontic treatment;
   decoupling the first and second protuberance from the first and second lingual surfaces of the first tooth and second tooth of the patient; and
   applying one or more orthodontic appliances to one or more lingual surfaces of one or more teeth of the patient subsequent to decoupling the first and second protuberances.

2. The method of claim 1, wherein the first and second protuberances are not configured to facilitate realigning teeth of the patient.

3. The method of claim 1, wherein the one or more orthodontic appliances comprises one or more brackets configured to engage with at least one archwire.

4. The method of claim 1, wherein applying one or more orthodontic appliances comprises placing an orthodontic component on at least one of the first lingual surface of the first tooth or second lingual surface of the second tooth.

5. The method of claim 4, wherein applying one or more orthodontic appliances comprises placing an orthodontic component on each of the first lingual surface of the first tooth and second lingual surface of the second tooth.

6. The method of claim 1, wherein the duration of time comprises at least one week.

7. The method of claim 1, wherein the duration of time comprises no longer than six weeks.

8. The method of claim 1, wherein the first and second protuberances comprise metal.

9. The method of claim 8, wherein the first and second protuberances are orthodontic buttons.

10. The method of claim 1, wherein the first and second protuberances comprise one or more polymers.

11. The method of claim 1, wherein the first and second protuberances are softer than the one or more orthodontic appliances.

12. The method of claim 1, wherein the first and second protuberances each comprise a proximal end that is adhered to the first and second lingual surfaces, wherein the distal free end of each of the first and second protuberances extends, respectively, away from the proximal ends in a lingual direction, and wherein the distal free end of each of the first and second protuberance is flat or rounded.

13. The method of claim 1, wherein decoupling the first and second protuberances and applying the one or more orthodontic appliances both occur within twenty-four hours.

14. A method of preconditioning a tongue of a patient for orthodontic treatment, the method comprising:
   depositing a first resin deposit on a first lingual surface of a first tooth of the patient;
   depositing a second resin deposit on a second lingual surface of a second tooth of the patient;
   curing the first resin deposit to form a first protuberance, the first protuberance extending away from the first lingual surface in a lingual direction;
   curing the second resin deposit to form a second protuberance, the second protuberance extending away from the second lingual surface in the lingual direction;
   allowing the tongue to adapt to a presence of the first and second protuberances for a duration of time to precondition the tongue for orthodontic treatment;
   removing the first and second protuberances from the first and second lingual surfaces; and
   applying one or more orthodontic appliances to the first lingual surface or the second lingual surface subsequent to decoupling the first and second protuberances.

15. The method of claim 14, wherein curing the first resin deposit to form the first protuberance comprises shining light on the first resin deposit with a light-delivery instrument, and wherein curing the second resin deposit to form the second protuberance comprises shining light on the second resin deposit with the light-delivery instrument.

16. The method of claim 14, further comprising shaping the first and second protuberances in situ after the curing the first resin deposit and the curing the second resin deposit.

17. The method of claim 16, wherein shaping the first and second protuberances comprises shaving the first and second protuberances into dome shapes.

18. The method of claim 16, wherein shaping the first and second protuberances comprises polishing the first and second protuberances.

* * * * *